(12) United States Patent
Erhart et al.

(10) Patent No.: US 9,965,820 B2
(45) Date of Patent: May 8, 2018

(54) PROXY-BASED RESERVATION SCHEDULING SYSTEM

(75) Inventors: George William Erhart, Loveland, CO (US); Valentine C. Matula, Granville, OH (US); David Joseph Skiba, Golden, CO (US); David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 686 days.

(21) Appl. No.: 12/328,620

(22) Filed: Dec. 4, 2008

(65) Prior Publication Data

US 2010/0145739 A1    Jun. 10, 2010

(51) Int. Cl.
*G06Q 50/28* (2012.01)
*G06Q 10/02* (2012.01)

(52) U.S. Cl.
CPC .............. *G06Q 50/28* (2013.01); *G06Q 10/02* (2013.01)

(58) Field of Classification Search
USPC ........................................................ 705/5–6
See application file for complete search history.

(56) References Cited

U.S. PATENT DOCUMENTS

| | | | |
|---|---|---|---|
| 5,857,152 | A | 1/1999 | Everett |
| 5,873,095 | A | 2/1999 | Gore |
| 5,959,568 | A | 9/1999 | Woolley |
| 6,510,380 | B1 | 1/2003 | Curatolo et al. |
| 6,612,488 | B2 | 9/2003 | Suzuki |
| 6,736,322 | B2 | 5/2004 | Gobburu et al. |
| 6,804,606 | B2 | 10/2004 | Jones |
| 6,845,362 | B2 | 1/2005 | Fruta et al. |
| 6,915,205 | B2 | 7/2005 | Kim et al. |
| 7,065,244 | B2 | 6/2006 | Akimov et al. |

(Continued)

FOREIGN PATENT DOCUMENTS

| | | |
|---|---|---|
| WO | WO9812504 A1 | 3/1998 |
| WO | 02073546 A2 | 9/2002 |

(Continued)

OTHER PUBLICATIONS

Schilit et al., "Context-Aware Computing Applications", "IEEE Workshop on Mobile Computing Systems and Applications", Dec. 8-9, 1994, Published in: US.

(Continued)

*Primary Examiner* — Tonya Joesph
(74) *Attorney, Agent, or Firm* — Sheridan Ross P.C.

(57) ABSTRACT

A system is disclosed that features a transport vehicle that carries responsive objects in which the objects are equipped to provide state information about their states when queried. The transport vehicle is outfitted with a proxy that represents the responsive objects. The proxy is configured such that it is better able than the responsive objects to receive state query signals from a querying device. The vehicle is also outfitted with I) sensors that detect the responsive objects and ii) sensors that detect state information of the vehicle, in which both sets of sensors provide information to the proxy. The object sensors are able to detect the state of each responsive object or query the object about its state in the same way as the querying device would query those objects in the prior art. The proxy then responds to the query on behalf of the responsive objects.

18 Claims, 2 Drawing Sheets

(56) References Cited

U.S. PATENT DOCUMENTS

| | | |
|---|---|---|
| 7,212,806 B2 | 5/2007 | Karaoguz |
| 7,283,846 B2 | 10/2007 | Spriestersbach et al. |
| 7,486,943 B2 | 2/2009 | Choti et al. |
| 7,737,861 B2 | 6/2010 | Lea et al. |
| 7,929,954 B2 | 4/2011 | Choti et al. |
| 8,103,250 B2 | 1/2012 | Sullivan et al. |
| 2002/0052786 A1 | 5/2002 | Kim et al. |
| 2003/0018613 A1 | 1/2003 | Oytac |
| 2003/0130893 A1 | 7/2003 | Farmer |
| 2004/0004117 A1 | 1/2004 | Suzuki |
| 2004/0019542 A1 | 1/2004 | Fuchs et al. |
| 2004/0078209 A1 | 4/2004 | Thomson |
| 2004/0078332 A1 | 4/2004 | Ferguson et al. |
| 2004/0082296 A1 | 4/2004 | Twitchell, Jr. |
| 2004/0111279 A1 | 6/2004 | Schoen et al. |
| 2005/0168340 A1 | 8/2005 | Mosher et al. |
| 2005/0222999 A1 | 10/2005 | Nihei |
| 2005/0234771 A1 | 10/2005 | Register et al. |
| 2005/0247775 A1* | 11/2005 | Gloekler et al. ............. 235/375 |
| 2006/0258367 A1 | 11/2006 | Chiang et al. |
| 2007/0027806 A1 | 2/2007 | Sands et al. |
| 2007/0073585 A1 | 3/2007 | Apple et al. |
| 2007/0174390 A1 | 7/2007 | Silvain et al. |
| 2007/0203765 A1 | 8/2007 | Schoen et al. |
| 2007/0225912 A1 | 9/2007 | Grush |
| 2007/0264974 A1 | 11/2007 | Frank et al. |
| 2008/0083826 A1 | 4/2008 | Henry et al. |
| 2008/0119160 A1 | 5/2008 | Adriansiferana et al. |
| 2008/0143484 A1 | 6/2008 | Twitchell |
| 2008/0143516 A1 | 6/2008 | Mock et al. |
| 2008/0167896 A1 | 7/2008 | Fast et al. |
| 2008/0174485 A1 | 7/2008 | Carani et al. |
| 2008/0231448 A1 | 9/2008 | Fowler et al. |
| 2009/0165092 A1 | 6/2009 | McNamara |
| 2009/0219169 A1 | 9/2009 | Herwats |
| 2009/0239667 A1 | 9/2009 | Rowe et al. |
| 2009/0271270 A1 | 10/2009 | Regmi et al. |
| 2010/0076777 A1 | 3/2010 | Paretti et al. |
| 2010/0077484 A1 | 3/2010 | Paretti et al. |
| 2010/0121567 A1 | 5/2010 | Mendelson |
| 2010/0153171 A1 | 6/2010 | Erhart et al. |
| 2010/0235218 A1 | 9/2010 | Erhart et al. |
| 2011/0196714 A1 | 8/2011 | Erhart et al. |
| 2011/0196724 A1 | 8/2011 | Fenton et al. |
| 2011/0215902 A1 | 9/2011 | Brown, III et al. |
| 2011/0252456 A1 | 10/2011 | Hatakeyama |
| 2012/0058784 A1 | 3/2012 | Niemenmaa et al. |

FOREIGN PATENT DOCUMENTS

| | | |
|---|---|---|
| WO | 2005045718 A1 | 5/2005 |
| WO | 2008151438 A1 | 12/2008 |

OTHER PUBLICATIONS

Abowd et al., "Cyberguide: A Mobile Context-Aware Tour Guide", Sep. 23, 1996, Publisher: Baltzer Journals, Published in: US.

Cheverst et al., "Developing a Context-aware Electronic Tourist Guide: Some Issues and Experiences", , Publisher: Mulitimedia Research Group, Published in: UK.

Cheverst et al., "Sharing (Location) Context to Facilitate Collaboration Between City Visitors", , Publisher: Multimedia Research Group, Published in: UK.

Chen, et al, "A Survey of Context-Aware Mobile Computing Research", "Dartmouth Computer Science Technical Report", Nov. 2000, pp. 1-16, vol. TR2000, No. 381, Published in: US.

Jedermann et al., "Transport Scenario for the Intelligent Container", "Understanding Autonomous Cooperation & Control in Logistics XP009129863", 2007, pp. 393-404, Publisher: Springer, Berlin.

Krafft, Gerald, "EP Application No. 09171160.6 Office Extended European Search Report dated Mar. 1, 2010", , Publisher: EPO, Published in: EP.

Hole, Andrew, "GB Application No. 0822854.6 Search Report", dated Apr. 16, 2009, Publisher: IPO, Published in: GB.

Mcwhirter, David, "GB Application No. 0822852.0 Search Report", dated Mar. 31, 2009, Publisher: UK IPO, Published in: GB.

Griffiths, Gareth, "GB Application No. GB0913222.6 Search Report dated Oct. 30, 2009", , Publisher: UK IPO, Published in: GB.

Official Action for U.S. Appl. No. 12/784,369, dated Aug. 8, 2013, 17 pages.

Final Action for U.S. Appl. No. 12/784,369, dated Mar. 14, 2013, 14 pages.

Final Action for U.S. Appl. No. 12/702,764, dated Jan. 4, 2013, 18 pages.

Restriction Requirementfor U.S. Appl. No. 12/702,764, dated Jul. 12, 2012, 6 pages.

Official Action for U.S. Appl. No. 12/784,369, dated Oct. 4, 2012, 11 pages.

Official Action for U.S. Appl. No. 12/713,512, dated Dec. 27, 2011, 16 pages.

Final Official Action for U.S. Appl. No. 12/713,512, dated Jun. 18, 2012, 23 pages.

Official Action for U.S. Appl. No. 12/702,764, dated Aug. 9, 2012, 13 pages.

Official Action for U.S. Appl. No. 12/713,512, dated Mar. 26, 2014, 24 pages.

Official Action for U.S. Appl. No. 12/702,764, dated Mar. 25, 2014, 16 pages.

Official Action for U.S. Appl. No. 12/713,512, dated Sep. 26, 2014, 12 pages.

Official Action for U.S. Appl. No. 12/702,764, dated Aug. 25, 2014, 25 pages.

* cited by examiner

_US 9,965,820 B2_

PROXY-BASED RESERVATION SCHEDULING SYSTEM

FIELD OF THE INVENTION

The present invention relates to the field of telecommunications in general, and, more particularly, to providing a mechanism for making of reservations concerning the transportation of one or more passengers or portable objects, such as a cargo unit.

BACKGROUND OF THE INVENTION

Dynamic rescheduling can be used to increase the quality of service in the transportation of goods and passengers. When a flight is delayed, it is probable that a passenger would miss a connecting flight and would be in need for a new flight reservation. Similarly, when meals are not served on a prolonged flight, it is foreseeable that a passenger would be hungry after the flight and need a restaurant reservation. Furthermore, when a perishable cargo reaches a higher than recommended temperature during its shipping, it is foreseeable that the cargo would spoil faster and that alternative shipping reservations need to be made so that the cargo can get to its destination earlier. The ability to make these reservations before the passenger has landed, or before the perishable cargo has spoiled, can bring a dramatic improvement in the transportation of goods and people and a further increase in customer satisfaction.

One method to make these reservations is to manually monitor the state of each passenger and each cargo unit transported and schedule the appropriate reservations as the need for them arises. However, the sheer number of passengers and cargo units in transit, at any point in time, makes this method unfeasible.

A better approach is to make the reservations automatically by associating each passenger and cargo unit with a "responsive object" capable of reporting the state of the passenger, or cargo unit. This way a central reservation system can be configured to periodically submit inquiries about the states of the "responsive objects" and make the appropriate reservations in response to the answers to those inquiries. The inquiries can originate from a location that is near the cargo unit being transported or from a location that is thousands of miles away from the unit. In either case, a portable object that is capable of responding to an inquiry about itself, such as an outfitted cargo unit, is considered to be a "responsive object." When a responsive object, is located outside, on land, and is stationary, the responsive object is usually able to receive and respond to an inquiry. In contrast, when a responsive object is inside a vehicle or an airplane, far from land, or moving, the ability of the responsive object to receive and respond to inquiries can be impeded. Therefore, a need exists for a reservation system that has an improved ability to monitor the condition and state of responsive objects.

SUMMARY OF THE INVENTION

Some embodiments of the present invention provide a mechanism for monitoring the state of responsive objects which are in transit, including their locations, without some of the disadvantages of the prior art, and using the state information for the cancellation and scheduling of transactions concerning the transportation of the cargo units, or passengers, with which the responsive objects are associated. For the purposes of this specification, a "responsive object," and its inflected forms, is defined as a portable object, such as a cellular phone or a wireless terminal, which is capable of responding to an inquiry about itself, such as a location- or other state-related query, having been outfitted with one or more sensors, a radio, and associated electronics. In accordance with the illustrative embodiment, a vehicle in which one or more responsive objects are present is outfitted with a proxy that represents the responsive objects. The proxy is configured such that it is better able than the responsive objects to receive position-determining signals from one or more Global Positioning System satellites, or from another position-determining source. In some embodiments, the proxy is also configured such that it is better able than the responsive objects to receive inquiry signals from a querying device and is therefore able to represent those objects. The vehicle is also outfitted with i) one or more sensors that detect the responsive objects that are present at the vehicle and ii) one or more sensors that detect state information of the vehicle. Both sets of sensors provide information to the proxy. In some embodiments, the responsive-object sensors are able to query each responsive object in the same way that the querying device queries those objects in the prior art. The state of the vehicle can comprise, but is not limited to, one or more of the vehicle's location, its destination, its weight, and one or more environmental conditions inside and/or outside the vehicle such as temperature, humidity, and barometric pressure.

Moreover, the illustrative embodiment also comprises a scheduler which monitors the state of the responsive objects and makes the appropriate reservations for their transportation. For example, the scheduler can be used to monitor whether a passenger on an airplane received a meal and make a restaurant reservation upon detecting that a meal was not served, such that the reservation is made in accordance with information contained in a preference database containing the preferences of the passenger with respect to price range and type of cuisine, for example.

More specifically, the scheduler determines whether the passenger was served a meal by making periodic inquiries to the responsive object associated with the passenger. When the scheduler submits an inquiry to the responsive object about its state, the proxy intercepts the inquiry and responds with the status of the vehicle. In accordance with the illustrative embodiment, the responsive objects use different protocols, and the proxy is multi-lingual in the sense that it can communicate with the inquirer with the same protocol that is used to communicate with the responsive object. In this way, the illustrative embodiment provides a mechanism for monitoring the location and condition of the responsive object without some of the costs and disadvantages for doing so in the prior art. The illustrative embodiment comprises: a preference database; a vehicle; a first object capable of responding to a first inquiry about the state of the first object, wherein the first inquiry is formatted in accordance with a first protocol; a first sensor for sensing when the first object is within the vehicle; a second sensor for sensing a first state of the vehicle; and a proxy for responding to a first inquiry about the state of the first object with the state of the vehicle when the first object is within the vehicle; and a scheduler for making reservations based on the response of the proxy.

DETAILED DESCRIPTION

Figure 1:
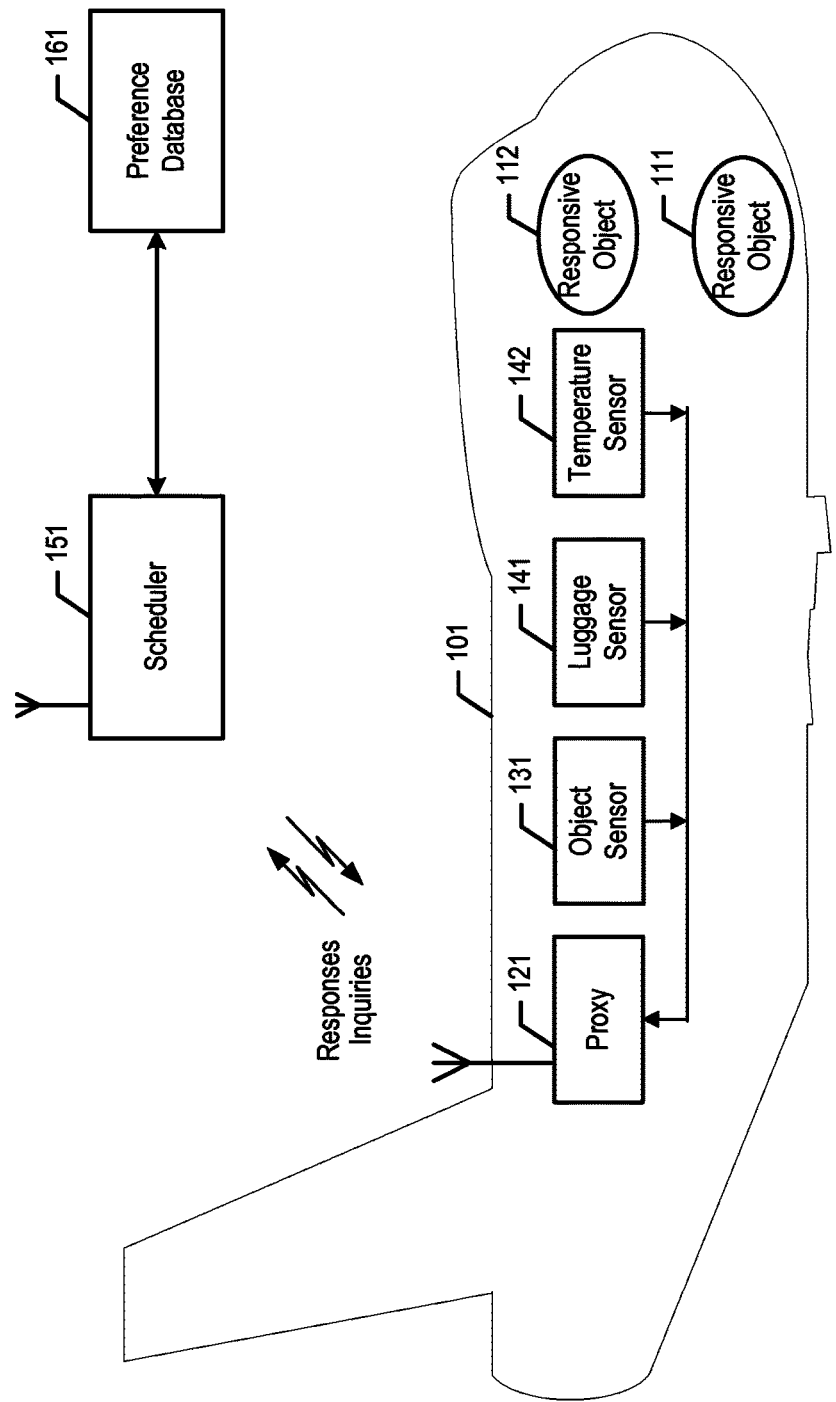
FIG. 1 depicts a schematic diagram of the salient components of reservation system 100 in accordance with the illustrative embodiment of the present invention.

FIG. 1 depicts a schematic diagram of the salient components of reservation system 100 in accordance with the illustrative embodiment of the present invention. Reservation system 100 comprises: vehicle 101, responsive object 111, responsive object 112, proxy 121, responsive object sensor 131, luggage sensor 141, temperature sensor 142, scheduler 151, and preference database 161, interrelated as shown.

The illustrative embodiment as disclosed herein comprises certain features, yet many variations of what is disclosed are possible. First, in accordance with the illustrative embodiment, proxy 121 is within vehicle 101, but it will be clear to those skilled in the art, after reading this disclosure, how to make and use alternative embodiments of the present invention in which proxy 121 is outside of vehicle 101. Second, in accordance with the illustrative embodiment, vehicle 101 comprises two responsive objects, but it will be clear to those skilled in the art, after reading this disclosure, how to make and use alternative embodiments of the present invention that comprise any number of responsive objects. Third, in accordance with the illustrative embodiment, vehicle 101 comprises one object sensor, one luggage sensor, and one temperature sensor, but it will be clear to those skilled in the art, after reading this disclosure, how to make and use alternative embodiments of the present invention that comprise any number and kind of environmental sensors, such as, for example and without limitation, barometric sensors, light sensors, gravimetric sensors, audio sensors etc.

Vehicle 101 is an airplane for carrying responsive object 111. In accordance with the illustrative embodiment, vehicle 101 is an airplane, but it will be clear to those skilled in the art, after reading this disclosure, how to make and use alternative embodiments of the present invention in which vehicle 101 is another mode of transportation, such as, for example and without limitation, a ship, an airplane, a train, etc. In any case, it will be clear to those skilled in the art how to make and use vehicle 101.

Responsive object 111 comprises:
(i) a payload (not shown),
(ii) a location sensor (not shown) for detecting the location of responsive object 111,
(iii) a humidity sensor (not shown) for detecting the ambient humidity in the proximity of responsive object 111,
(iv) a temperature sensor (not shown) for detecting the ambient temperature in the proximity of responsive object 111,
(v) hardware and software (not shown) that is capable of responding to an inquiry about the state of responsive object 111 with information from the location sensor, the humidity sensor, and the temperature sensor.

In accordance with the illustrative embodiment, responsive object 111 is associated with a cargo unit, such as a freight container, but it will be obvious to those skilled in the art how to devise alternative embodiments of the present invention where responsive object 111 is associated with a person. In accordance with the illustrative embodiment, the inquiry is formatted in accordance with a first protocol. It will be clear to those skilled in the art how to make and use responsive object 111.

As those who are skilled in the art will appreciate, in some alternative embodiments, a second responsive object can be present, either within vehicle 101 or within another vehicle. If this is the case, second responsive object comprises different software or hardware from first responsive object, and is capable of receiving an inquiry formatted in accordance with a second protocol that is different from the first protocol. However, it will be clear to those skilled in in the art, after reading this disclosure, how to make and use other alternative embodiments of the present invention in which the first protocol and the second protocol are the same. Also, it would be clear to those skilled in the art, after reading this disclosure, how to make alternative embodiments of the present invention in which the hardware and software comprising responsive object 111 and second responsive object are the same. Furthermore, in accordance with the illustrative embodiment, responsive object 111 is associated with a cargo unit, such as a freight container, but it will be obvious to those skilled in the art how to devise alternative embodiments of the present invention where responsive object 111 is associated with a person, such as, and without limitation, an airplane passenger, train passenger, bus passenger, etc.

Proxy 121 is hardware and software for responding to inquiries about the state of responsive object 111 when responsive object 111 is unavailable to respond to those inquiries itself. For example, when responsive object 111 is on an airplane, its radio transmitter may be turned off to avoid interference with the airplane's avionics. In such case, proxy 121 would compensate for the unavailability of responsive object 111 by intercepting queries directed to responsive object 111 and answering those inquiries by using input from responsive object sensor 131, luggage sensor 141 and temperature sensor 142, which are described below. In accordance with the illustrative embodiment, proxy 121 is capable of responding to inquiries directed to responsive object 111 in accordance with the first protocol and to inquiries directed to other responsive objects.

Responsive object sensor 131 is hardware and software for detecting the presence or absence of responsive object 111 inside of vehicle 101 and for detecting the presence or absence of responsive object 112 inside of vehicle 101. In accordance with the illustrative embodiment, responsive object sensor 131 comprises a single housing, but it would be clear to those skilled in the art how to make and use alternative embodiments of the present invention in which responsive object sensor 131 comprises multiple housings. Furthermore, in accordance with the illustrative embodiment, responsive object sensor 131 uses radio-frequency identification ("RFID") tags in well-known fashion, but it will be clear to those skilled in the art, after reading this disclosure, how to make and use alternative embodiments of the present invention in which responsive object sensor 131 is something else, such as and without limitation, an optical bar code system, etc. In accordance with the illustrative embodiment, responsive object sensor 131 is located inside vehicle 101, but it will be clear to those skilled in the art, after reading this disclosure, how to make and use alternative embodiments of the present invention in which responsive object sensor 131 is located outside of vehicle 101. It will be clear to those skilled in the art how to make and use responsive object sensor 131.

Luggage sensor 141 is hardware and software for detecting whether the luggage of a passenger associated with responsive object 111 is on vehicle 101. In accordance with the illustrative embodiment, luggage sensor 141 comprises a single housing, but it would be clear to those skilled in the art how to make and use alternative embodiments of the present invention in which luggage sensor comprises multiple housings. In accordance with the illustrative embodiment, luggage sensor 141 uses radio frequency identification ("RFID") in well known, but it will clear to those skilled in the art how to make and use alternative embodiments of the present invention in which luggage sensor comprises something else, such as and without limitation, optical bar code system, or a connection to a central database that contains a registration of what luggage is on board of vehicle 101. It would be clear to those skilled in the art how to make and use luggage sensor 141.

Temperature Sensor 142 is hardware for measuring the temperature inside and outside of vehicle 101. Temperature sensor 142 acts as a proxy for the temperature sensors within responsive object 111 and responsive object 112, respectively. Although temperature sensor 143 is depicted in FIG. 1 as comprising a single housing within vehicle 101, it will be clear to those skilled in the art, after reading this disclosure, how to make and use alternative embodiments of the present invention in which temperature sensor 143 is outside of vehicle 101. Furthermore, it will be clear to those skilled in the art, after reading this disclosure, how to make and use alternative embodiments of the present invention in which temperature sensor 142 comprises a plurality of housings. And still furthermore, it will be clear to those skilled in the art, after reading this disclosure, how to make and use alternative embodiments of the present invention in which temperature sensor 142 comprises a connection to a weather reporting service, such as, for example, http://www.weather.gov. It would be clear to those skilled in the art how to make and use temperature sensor 142.

Scheduler 151 is hardware and software for making shipping reservations in response to the state of responsive object 111 as reported by proxy 121 where the reservations comply with limitations and specifications in preference database 161. In accordance with the illustrative embodiment, scheduler 151 is for making reservations for the transportation of a cargo unit, but it would be obvious to those skilled in the art, after reading this specification, how to devise alternative embodiments where scheduler 151 is used for the making of passenger travel reservations. In accordance with the present embodiment, scheduler 151 is for the making of shipping reservations, but it will be obvious to those skilled in the art, after reading this specification, how to make and use alternative embodiments of the present invention in which the scheduler is for executing any possible travel-related transaction, such as and not limited to, hotel reservation, flight cancellation, restaurant reservation, purchasing of theater tickets, etc.

Preference database 161 is hardware and software for storing preferences, limitations and specifications for the making of reservations concerning responsive object 111. In accordance with the illustrative embodiment, preference database 161 stores information about what expenses are acceptable with respect to the reservations made by scheduler 151, but it would be obvious to those skilled in the art, after reading this disclosure, how to devise alternative embodiments of the present invention in which preference database 161 is, for example and not limited to, storing corporate employee expense policies, personal dietary preferences, etc. In accordance with the illustrative embodiment, FIG. 1 depicts scheduler 151 and preference database 161 as contained in separate housings, but it will be obvious to those skilled in the art, after reading this specification, how to make and use alternative embodiments of the present invention where scheduler 151 and preference database are contained in the same housing.

Figure 2:
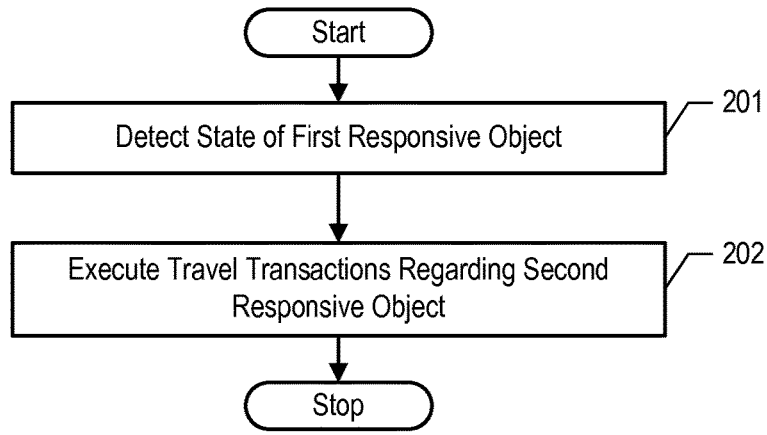
FIG. 2 depicts a flowchart of the salient tasks associated with the illustrative embodiment of the present invention.

FIG. 2 depicts a flowchart of the salient tasks associated with the illustrative embodiment of the present invention.

At task 201, scheduler 151 detects the state of responsive object 111 by making an inquiry in accordance with a first protocol. Task 201 comprises several sub-steps which are described in detail in the discussion concerning FIG. 3 below.

At task 202, scheduler 151 executes transactions concerning the transportation of a cargo unit associated with responsive object 111, as necessary, based on the state of responsive object 111. For example, a perishable cargo unit can have a life of 30 days if stored at a temperature of 30 degrees Celsius or less, and 60 days if kept under 20 degrees Celsius or less. In accordance with the illustrative embodiment of the present invention, the temperature of the cargo unit associated with responsive object 111 is monitored through proxy 121 and when the temperature of the cargo unit is such that the cargo unit is likely to spoil before the arrival to its destination, scheduler 151 cancels all existing shipping arrangements for the cargo unit and schedules new ones that would allow the cargo unit to arrive at its destination faster. However, it will be obvious to those skilled in the art, after reading this specification, how to make and use alternative embodiments of the present invention in which scheduler 151 makes passenger transportation reservations, dinner reservations, theater tickets purchases, etc.

Figure 3:
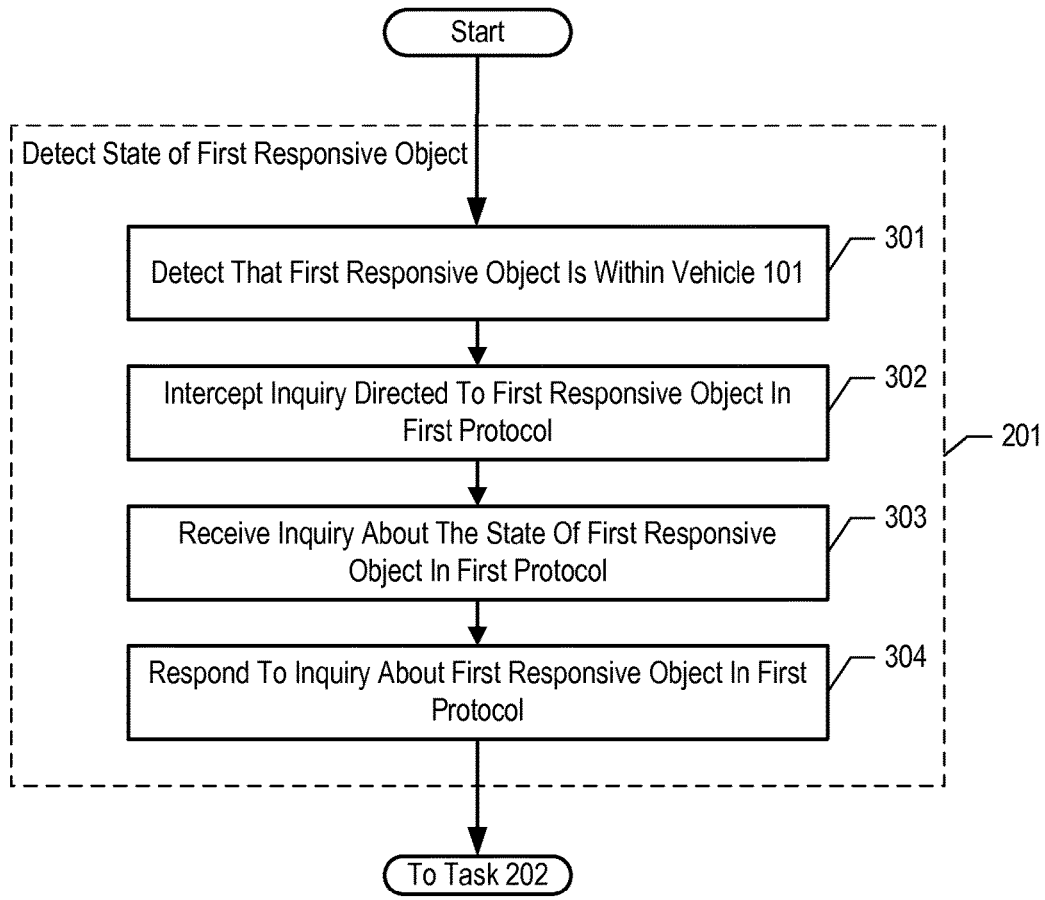
FIG. 3 is a flowchart depicting the salient subtasks associated with the performance of task 201.

FIG. 3 is a flowchart depicting the salient subtasks associated with the performance of task 201.

At task 301, object sensor 131 detects the presence of responsive object 111 inside vehicle 101, which indicates that responsive object 111 is unwilling or incapable of responding to inquiries about its own status. It will be clear to those skilled in the art how to make and use embodiments of the present invention that accomplish task 301

At task 302, proxy 121 intercepts an inquiry directed to responsive object 111, regarding a state of responsive object 111, and in accordance with a first protocol. In accordance with the illustrative embodiment of the present invention, the inquiry is transmitted to proxy 121 via wireless telecommunications. In accordance with the illustrative embodiment, the inquiry is about the temperature of a cargo unit associated with responsive object 111, but it would be obvious to those skilled in the art how to make and use alternative embodiments of the present invention where the the inquiry is regarding whether the luggage of a passenger associated with responsive object 111 is on vehicle 101, or whether the passenger would be hungry after an airplane flight, etc.

At task 304, proxy 121 responds to the inquiry for responsive object 111 with the state of vehicle 101 in accordance with the first protocol. For example, to the inquiry about the temperature of responsive object 111, proxy 121 would respond with the temperature of vehicle 101 (as measured by temperature sensor 143) in accordance with the first protocol. In accordance with the illustrative embodiment, the operation of proxy 121 is invisible to transmitter of the inquiry, but it will be clear to those skilled in the art, after reading this disclosure, how to make and use alternative embodiments of the present invention in which the operation of proxy 121 is made known to the transmitter of the inquiry.

What is claimed is:
1. A system comprising:
a vehicle;

a first responsive object capable of responding to a first inquiry about the state of the first responsive object, wherein the first inquiry is formatted in accordance with a first protocol;

a proxy for responding to the first inquiry about the state of the first responsive object with the state of the vehicle when the first responsive object is (a) within the vehicle and (b) inoperable to respond to the first inquiry; and a scheduler for making a reservation based on a response from the proxy;

wherein the first responsive object comprises a first sensor that is used by the first responsive object to determine the state of the first responsive object;

wherein the vehicle comprises a second sensor; and wherein the proxy intercepts the first inquiry that is directed to the first responsive object, when the first responsive object is within the vehicle, and responds to the first inquiry with the state of the vehicle as measured by the second sensor.

2. The system of claim 1 comprising:

a second responsive object for responding to a second inquiry about the state of the second responsive object, wherein the second inquiry is formatted in accordance with a second protocol;

wherein the proxy is also for responding to the second inquiry about the state of the second responsive object with the state of the vehicle when the second responsive object is within the vehicle; and wherein the first protocol is different than the second protocol.

3. The system of claim 1 wherein the vehicle comprises a third sensor for detecting the state of the vehicle.

4. The system of claim 1 wherein the state of the vehicle is location.

5. The system of claim 1 wherein the state of the vehicle is temperature.

6. The system of claim 1 wherein the second sensor utilizes a connection to a database for storing information about the state of the vehicle.

7. The system of claim 1 wherein the first responsive object is a wireless terminal associated with a passenger.

8. The system of claim 1 wherein the first responsive object is associated with a cargo unit.

9. The system of claim 1 comprising:

a preference database storing reservation preferences associated with the first responsive object; and wherein the scheduler is for making a reservation based on both the response from the proxy and information obtained from the preference database.

10. A system comprising:

a first responsive object capable of responding to a first inquiry about the state of the first responsive object, wherein the first inquiry is formatted in accordance with a first protocol;

a proxy for responding to the first inquiry about the state of the first responsive object with the state of a containing vehicle when the first responsive object is (a) within the containing vehicle and (b) inoperable to respond to the first inquiry; and a scheduler for making a reservation based on a response from the proxy;

wherein the first responsive object comprises a first sensor that is used by the first responsive object to determine the state of the first responsive object;

wherein the vehicle comprises a second sensor; and wherein the proxy intercepts the first inquiry that is directed to the first responsive object, when the first responsive object is within the vehicle, and responds to the first inquiry with the state of the vehicle as measured by the second sensor.

11. The system of claim 10, wherein the containing vehicle is operable to be conveyed by a conveying vehicle.

12. The system of claim 11, wherein the containing vehicle is luggage.

13. The system of claim 10, wherein the first responsive object is inoperable to respond to the first inquiry in response to being placed in an inoperable mode.

14. The system of claim 10, wherein the scheduler for making a reservation based on the response from the proxy, comprises, making a reservation to accommodate a cargo state, as measured by the state of the first responsive object.

15. The system of claim 14, wherein the state of the first responsive object is indicative of spoilage of the cargo and the reservation is based on at least one of mitigating the spoilage, processing of the spoilage, disposal of the spoilage, and replacement of the spoilage.

16. The system of claim 10, wherein the scheduler for making a reservation based on the response from the proxy, comprises, making a reservation to accommodate a passenger not being served a scheduled meal.

17. A method, comprising:

receiving, at a first responsive object, a first inquiry about the state of the first responsive object, wherein the first inquiry is formatted in accordance with a first protocol;

responding, by a proxy, to the first inquiry about the state of the first responsive object with the state of the vehicle when the first responsive object is (a) within the vehicle and (b) inoperable to respond to the first inquiry; and making a reservation, by a scheduler, based on a response from the proxy;

wherein the first responsive object comprises a first sensor that is used by the first responsive object to determine the state of the first responsive object;

wherein the vehicle comprises a second sensor; and intercepting, by the proxy, the first inquiry that is directed to the first responsive object, when the first responsive object is within the vehicle and responds to the first inquiry with the state of the vehicle as measured by the second sensor.

18. The method of claim 17, further comprising:

responding, by a second responsive object, to a second inquiry about the state of the second responsive object, wherein the second inquiry is formatted in accordance with a second protocol;

responding, by the proxy, to the second inquiry about the state of the second responsive object with the state of the vehicle when the second responsive object is within the vehicle; and wherein the first protocol is different than the second protocol.

* * * * *